United States Patent [19]
Hasvold

[11] Patent Number: 5,405,717
[45] Date of Patent: Apr. 11, 1995

[54] SEAWATER CELL WITH INCREASED EFFICIENCY

[75] Inventor: Øistein Hasvold, Oslo, Norway

[73] Assignee: Forsvarets Forskningsinstitutt, Norway

[21] Appl. No.: 30,476

[22] PCT Filed: Sep. 16, 1991

[86] PCT No.: PCT/NO91/00117
§ 371 Date: Mar. 23, 1993
§ 102(e) Date: Mar. 23, 1993

[87] PCT Pub. No.: WO92/05596
PCT Pub. Date: Apr. 2, 1992

[30] Foreign Application Priority Data
Sep. 24, 1990 [NO] Norway .................... 904143

[51] Int. Cl.⁶ .............................................. H01M 6/34
[52] U.S. Cl. .................................. 429/119; 429/175; 429/241
[58] Field of Search ................ 429/119, 175, 241; H01M 6/34

[56] References Cited

U.S. PATENT DOCUMENTS

| | | | |
|---|---|---|---|
| 2,721,342 | 10/1955 | Pickren | 429/119 X |
| 3,401,063 | 9/1968 | Opitz | 429/119 |
| 3,497,393 | 2/1970 | Dreisbach et al. | 429/218 X |
| 3,542,599 | 11/1970 | Fiandt | 429/119 |
| 3,907,596 | 9/1975 | Ketler | 136/100 |
| 4,601,961 | 7/1986 | McCartney | 429/119 |
| 4,822,698 | 4/1989 | Jackovitz et al. | 429/119 X |

FOREIGN PATENT DOCUMENTS
68023  6/1947  Norway .

*Primary Examiner*—John S. Maples
*Attorney, Agent, or Firm*—Robbins, Berliner & Carson

[57] ABSTRACT

This invention relates to a sea water cell which uses wave action to increase the flow of the water through the cathode. The cell has an anode and a cathode arranged in an open cell structure to allow the electrolyte, i.e. the sea water, to flow through the structure. The cell structure is provided with water flow deflector means causing water flow through the cell to be deflected from the vertical direction, when the cell is suspended from or attached to a buoyancy device. The water flow deflector is preferably arranged in the upper end of the cell.

11 Claims, 4 Drawing Sheets

SEAWATER CELL WITH INCREASED EFFICIENCY

TECHNICAL FIELD

The present invention relates to sea water cells or batteries which use oxygen dissolved in sea water as oxidants, as for instance cells described in international patent application Nos. PCT/N089/00040 and PCT/N090/00045.

BACKGROUND ART

The sea water cell described consists of an anode made from an electronegative alloy e.g. based on magnesium, zinc, aluminum or lithium, and the cathode is a more or less inert current conductor. Common materials in the cathodes are materials which are resistant to sea water, such as copper, stainless steel, titanium or carbon. The cathode may also be coated with a catalyst which catalyzes the reduction of oxygen. Sea water contains little oxygen, about 10 g/m$^3$. As a result of this the oxygen reducing sea water cells must have a very open structure in order to allow sufficient flow of fresh sea water through the cathode. Batteries consist usually of cells which are connected in parallel because the cells have the seawater as a common electrolyte. The common electrolyte would give short circuit currents via the sea water in series connected batteries. A DC/DC converter converts the low voltage (1 to 2 V) of the sea water cell to a more useful value, as e.g. 28 V.

In a battery having magnesium anodes the following reaction will take place:
At the anode: $2\ Mg = 2\ Mg^{2+} + 4\ e^-$
The electrons liberated at the negative electrode are consumed at the positive electrode (the cathode):

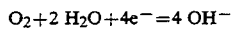

$$O_2 + 2\ H_2O + 4e^- = 4\ OH^-$$

The concentration of oxygen in sea water is low, so that the transport of oxygen to the surface of the cathode will be the reaction step limiting the performance of the battery. Further one has to ensure that the surface of the electrode does not become so alkaline that it leads to deposition of calcium carbonate from the sea water, as this may form a layer on the cathode. Such a layer will, if it is formed, lead to a permanent reduction of the performance of the battery. For this reason the alkalization must be limited. This is obtained by limiting the current so that it does not exceed a certain percentage of the limiting current of the cathode. The limiting current is the current density at which the concentration of oxygen at the surface of the electrode is zero, in other words where the current density is so high that any oxygen molecule which is transported to the electrode surface by diffusion or convection, is reduced by formation of hydroxyl ions. The cathode is therefore given such a structure that a highest possible limiting current is obtained. A different parameter which is often used in literature is the so called mass transfer coefficient, $k_m$, which in this case is the limiting current density divided by the oxygen concentration.

The limiting current density increases with increased water velocity, oxygen concentration and temperature and decreases with increased size of the cathode element. It has been found to be advantageous to make the cathode from expanded metal, net or metal wool because this can limit the size of the cathode in the flow direction of the sea water. The cathode can also be designed so that there is little resistance against flow-through, so that the sea water within the cathode is renewed continuously. These problems and solutions are described in int. pat. appl. PCT/N090/00045.

DESCRIPTION OF INVENTION

The object of the present invention is to increase the efficiency of sea water cells of the above mentioned type. The main features of the invention are defined in the following patent claims. The invention makes use of the vertical movement of the sea water cell to increase the water flow through the cathode and thereby the maximum current delivered by the cell.

BRIEF DESCRIPTION OF DRAWINGS

Above mentioned and other features and objects of the present invention will clearly appear from the following detailed description of embodiments of the invention taken in conjunction with the drawings, where.

BEST MODE FOR CARRYING OUT THE INVENTION

Figure 1:
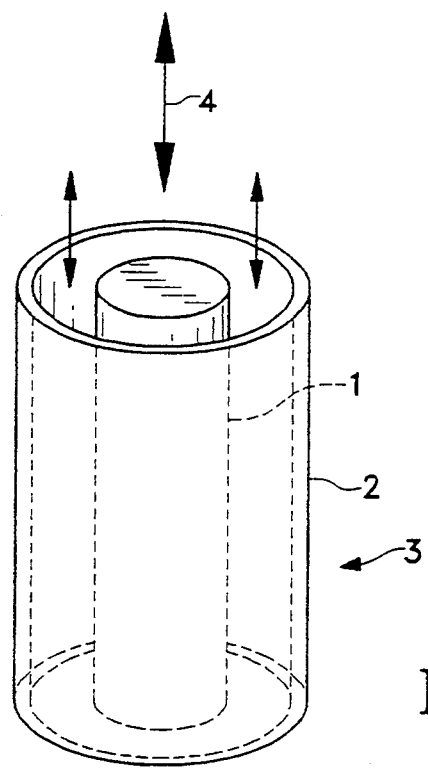
FIG. 1 shows a sketch of a sea water cell.

FIG. 1 shows a typical sea water cell which is placed in the sea water (the electrolyte). The cell 3 is open in top and bottom and it is provided with an anode 1 and a cathode 2. At least the cathode 2 has an open structure so that water can flow through its walls. The flow through of the cathode is obtained by the horizontal component of the water flow. If the cell is moved in the vertical direction as the arrow 4 shows, this movement does not lead to formation of pressure gradients across the cathode and leads therefore also very little to increased through flow the cathode walls.

Figure 2:
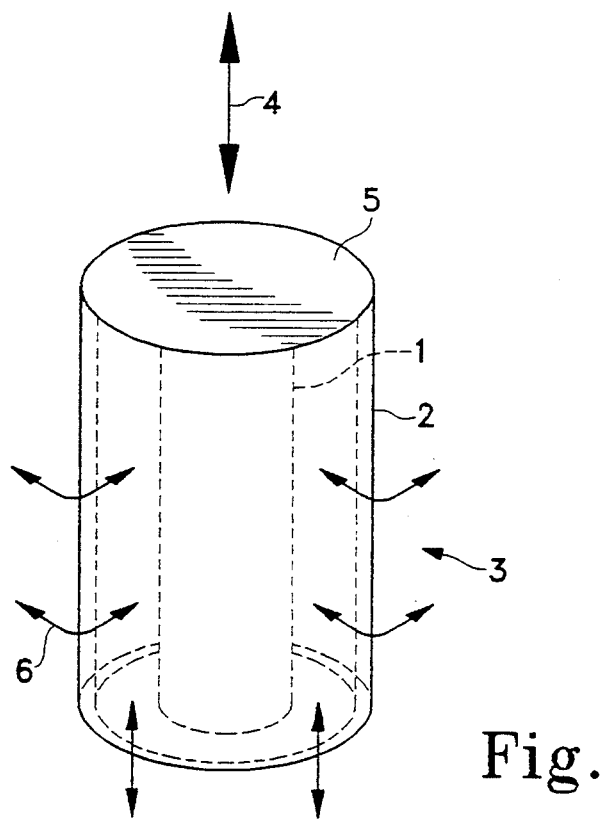
FIG. 2 shows the principle of the invention.

In FIG. 2 is shown what happens when the seawater cell is closed in one end with a lid 5. The lid may be tight, or it may be partly open, and it can also be provided with valves (not shown) which possibly could be controlled by the water flow. An upwards movement of the cell will lead to an underpressure within the cell, and water will be sucked in through the walls of the cathode from the outside. Correspondingly a movement of the cell downwards will lead to an overpressure on the inside of the cell so that water is pressed out through the cathode walls. These water flow directions are indicated with the arrow 6.

It should be obvious that whether the constriction to flow is located in the top, the middle or the bottom of the cell, vertical cell movement will result in an increased transport of seawater through the cathode. But as the reaction product from the anode and biofouling organism as barnacles and mussels sink in seawater, the preferred location to prevent clogging is in the top of the cell.

It is only the velocity of the seawater, not the direction, that determines the transport of oxygen to the cathode surface as long as the concentration of oxygen in the bulk of the seawater is unchanged. Therefore, one-way valves (not shown) in the constriction guarantees fresh seawater, but may do so at the expense of the amount of oxygen made available to the cathode surface.

Figure 3:
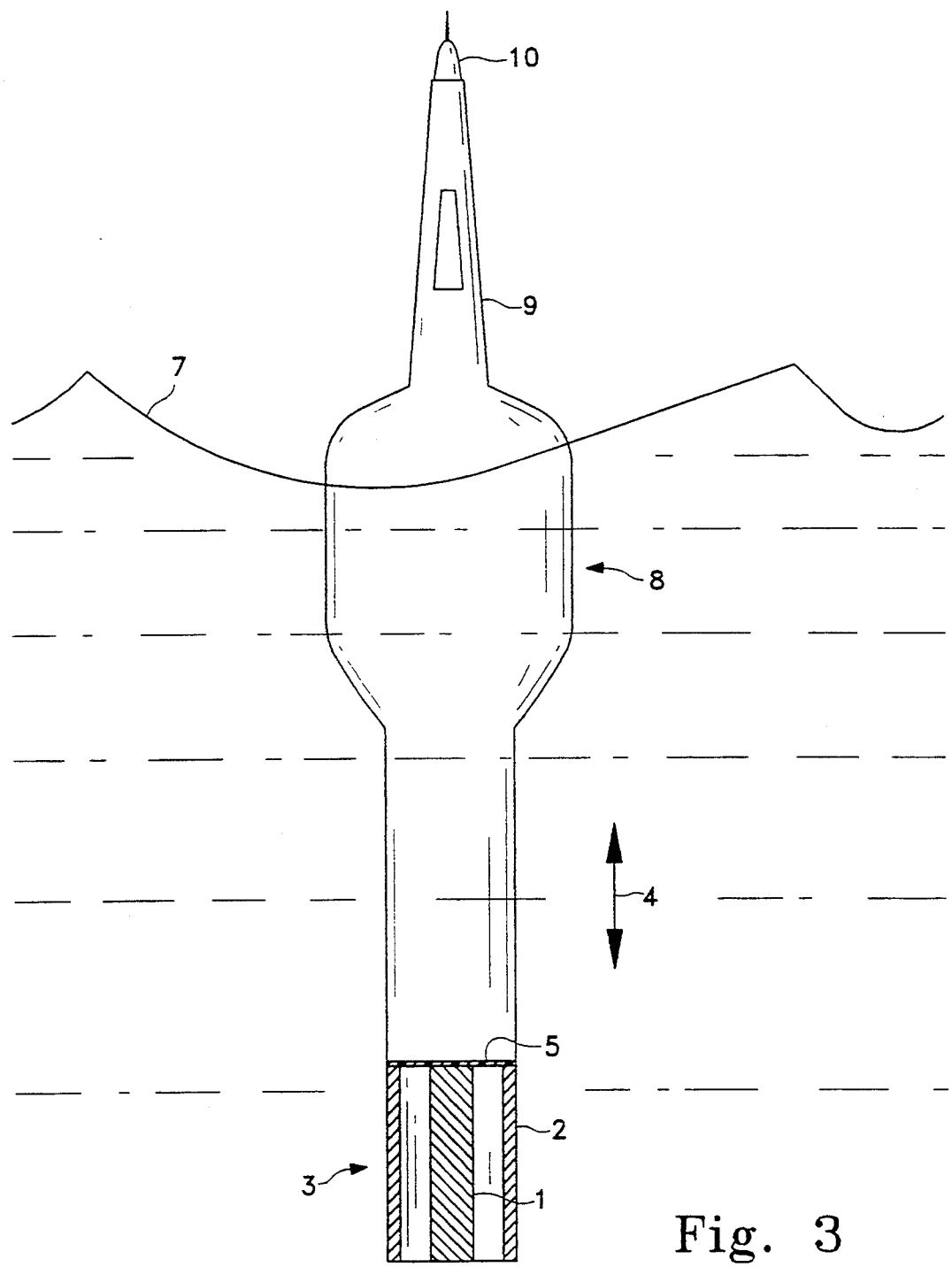
FIG. 3 shows a light buoy

The energy for moving the cell up and down in the water can be taken from the sea waves by giving the combination of buoyancy device and sea water cell such a shape that the waves 7 (FIG. 3) will move the buoy and the cell up and down in the sea. FIG. 3 shows employment of the invention in a light buoy with a cylindrical buoyancy device 8 which in its lower end has about the same diameter as the cathode 2 of the sea water cell. The cell is provided with a flow deflector 5 in its top facing the buoyancy device 8 to completely or partly deflect the seawater. A light source 10 is mounted on a stand 9 on the buoyancy device. The converter and the secondary battery (not shown) for powering the light source during periods of low sea currents and low wave height, are also mounted in the light buoy.

Figure 4:
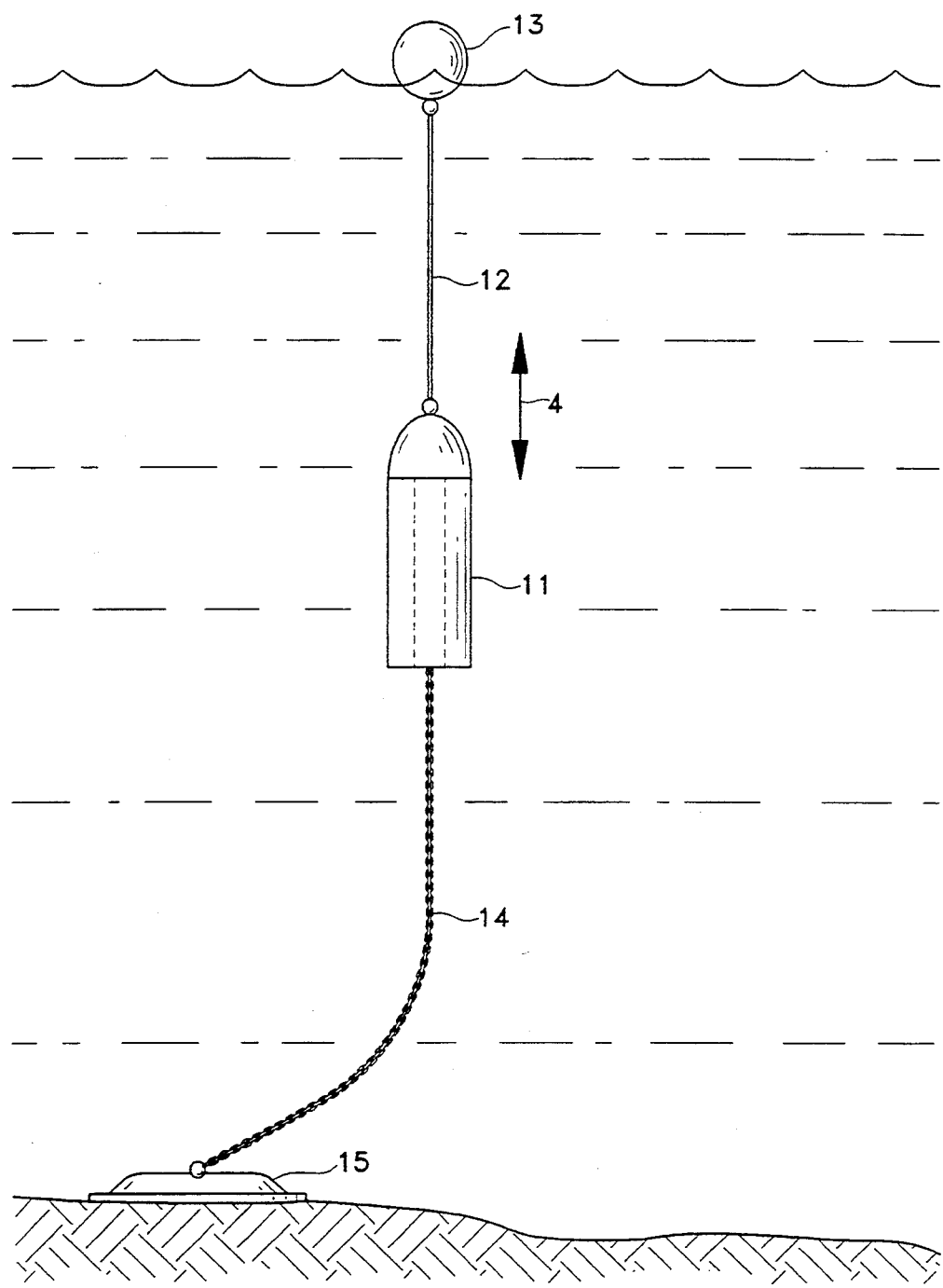
FIG. 4 shows the embodiment of a cell which is suspended in accordance with the invention.

For certain applications, like in fjords with frequently occurring fresh water layers in the surface, one does not wish to attach the cell or the battery to the buoy itself, but place it at a greater depth. This is illustrated in FIG. 4. A connection 12 between a buoy 13 and a cell 11 should be non-elastic, e.g. consisting of an aramide rope, wire or chain while a connection 14 to an anchor 15 should be elastic or flexible, e.g. by using a chain which is substantially longer than the distance between the sea water battery and the bottom. As indicated in FIG. 4 it is preferred to give the closure or deflector in the top of the cell 11 a rounded form so as not to unnecessarily reduce the vertical movement of the cell.

Figure 5:
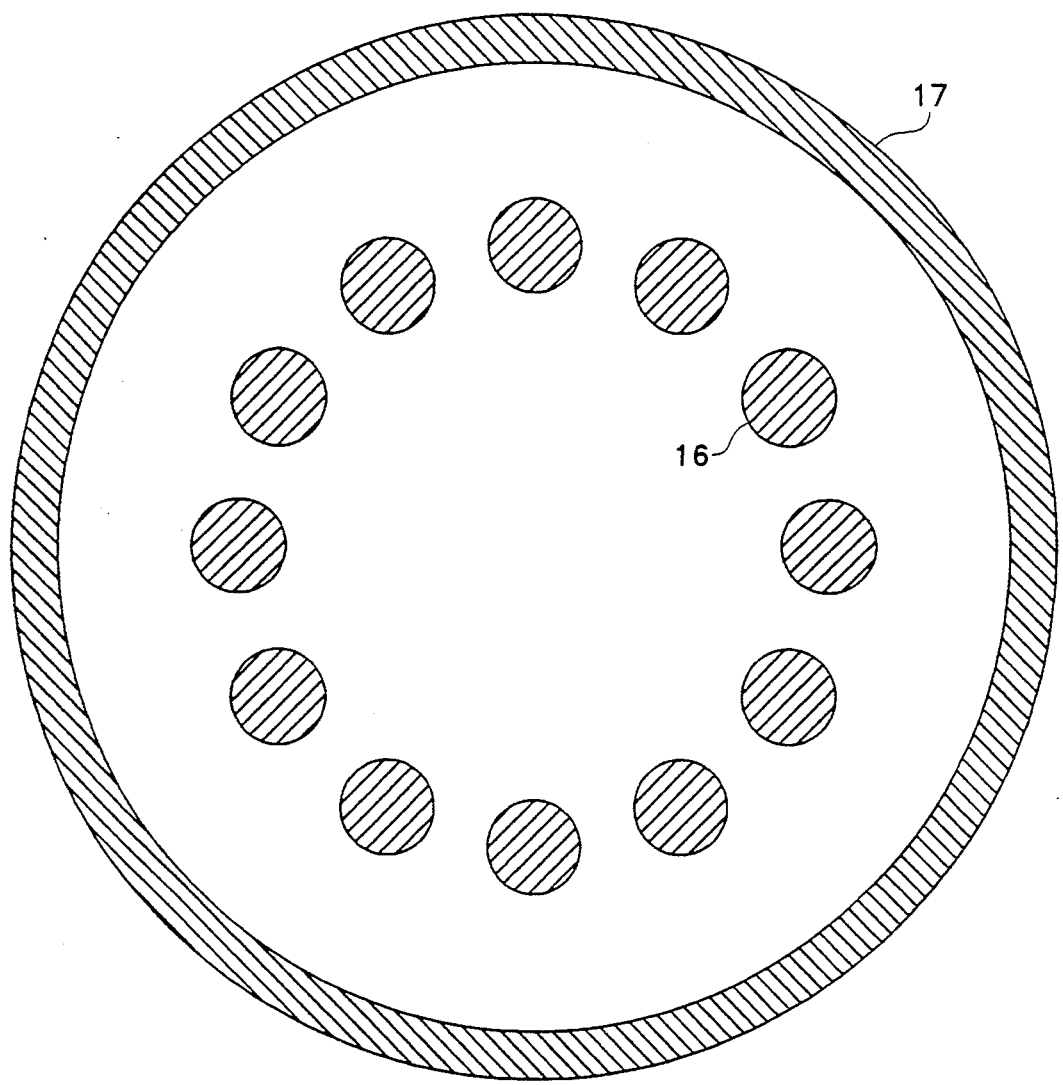
FIG. 5 shows an anode structure.

In the above described examples it has been assumed that the cells have a long life. Here the anode 1 either has the shape of a rod or a pipe in order to contain sufficient magnesium. For cells where the life time is short, and where the required amount of magnesium is low, the flow through the cell can be further increased by e.g. giving the anode the form of a collection of rods 16 as shown in FIG. 5. The figure illustrates a sea water cell seen from below. Anode rods 16 are interconnected in the top (not shown) and the connection is preferably molded into a polymer (not shown). The cathode 17 can as previously mentioned be a flow-through electrode, e.g. in the form of a helix of an expanded copper sheet catalyzed with silver. The deflector or closure of the cell in the top may be either as shown in FIG. 3 with a buoyancy device or as shown in FIG. 4 with a rounded top. By making the anodes as mentioned, the open area of the bottom of the cell is increased. At the same time the flow through the anode is increased. Both these remedies add to increased flow through the cathode. Anodes for short life time batteries, i.e. batteries or cells requiring little magnesium, can be formed may also be formed as a perforated tube, or as a cylinder of expanded metal.

The above detailed description of embodiments of this invention must be taken as examples only and should not be considered as limitations on the scope of protection.

I claim:

1. Sea water cell using oxygen dissolved in sea water as an oxidant, said cell comprising:
   an anode,
   a cathode having an open structure surrounding an open interior to allow sea water to flow horizontally through the cathode between said open interior and a vertical exterior surface of said cathode,
   a horizontal opening between said open interior and a horizontal exterior surface of said cell,
   suspension means for inducing vertical movements to the cell in response to wave action of the sea water on a buoyancy device, to thereby induce a vertical flow of sea water through the horizontal opening, and
   water flow deflector means associated with the open interior for causing substantially all of the vertical flow of sea water through the horizontal opening to be deflected to a substantially horizontal flow of sea water through the cathode,
   wherein substantially all the sea water flow through the cathode is induced by vertical movements of the cell and flows horizontally through the cathode.

2. Cell according to claim 1, wherein the suspension means comprises a mechanical connection between the cell and the buoyancy device.

3. Cell according to claim 1, wherein the water flow deflector means is disposed at an upper end of the cell.

4. Cell according to claim 3, wherein the deflector means comprises a lid covering at least part of a second horizontal opening into the cell.

5. Cell according to claim 1, wherein the deflector means is at least partly structurally integrated with the anode and cathode.

6. Cell according to claim 5, wherein the anode has an open structure through which the sea water may flow as it is deflected by the deflector means.

7. Cell according to claim 6, wherein the anode consists of a number of vertical rods arranged in parallel, thereby increasing the horizontal water flow through the cathode when the cell is moved vertically.

8. Cell according to claim 1, wherein the cell is suspended above a sea bed and the suspension means comprises a flexible connection between the cell and the sea bed.

9. Cell according to claim 2, wherein the mechanical connection is a non-elastic connection.

10. Cell according to claim 9, wherein the deflector means is disposed at an upper end of the cell.

11. Cell according to claim 10, wherein the deflector means comprises a lid covering at least part of a second horizontal opening into the cell.

* * * * *